United States Patent [19]
Song et al.

[11] Patent Number: 6,045,844
[45] Date of Patent: Apr. 4, 2000

[54] METHOD FOR THE INHIBITION OF FUNGAL GROWTH IN FRUITS AND VEGETABLES

[75] Inventors: Jun Song, Nova Scotia, Canada; Randolph M. Beaudry, East Lansing, Mich.; LiHua Fan, Nova Scotia, Canada; Weimin Deng, Santa Monica, Calif.; Rujida Leepipattanawit, Lansing, Mich.

[73] Assignee: Board of Trustees operating Michigan State University, East Lansing, Mich.

[21] Appl. No.: 09/140,374

[22] Filed: Aug. 26, 1998

Related U.S. Application Data

[60] Provisional application No. 60/057,113, Aug. 28, 1997.

[51] Int. Cl.[7] .......................... A23B 55/00; A23L 3/3409
[52] U.S. Cl. .......................... 426/312; 426/316; 426/320; 426/335; 426/532; 426/418; 426/419; 426/442
[58] Field of Search .................................... 426/312, 316, 426/320, 532, 534, 533, 615, 418, 419, 442, 809, 335

[56] References Cited

U.S. PATENT DOCUMENTS

| | | |
|---|---|---|
| 4,336,273 | 6/1982 | Lee . |
| 4,387,248 | 6/1983 | Pickenhagen . |
| 5,698,599 | 12/1997 | Subbiah .................................. 514/703 |

FOREIGN PATENT DOCUMENTS

| | | |
|---|---|---|
| 283565 | 10/1990 | Germany . |
| 362294046 | 12/1987 | Japan . |

OTHER PUBLICATIONS

William Frazier & Dennis Westhoff, Food Microbiology 4th Ed., McGraw Hill Inc., p. 206, 23–32, 1988.

Vaughn, S.F., et al., J. Food Sci. 58:793–796 (1993).

Sholberg, P.L., et al., HortScience 30:1271–1275 (1995).

Paz, O., et al., J. Food Sci. 47:270–273 (1982).

Bartley, I.M., et al., J. Sci. Food Agr. 36:567–574 (1985).

Beaudry, R.M., et al., J. Amer. Soc. Hort. Sci. 117:436–441 (1992).

Cameron, A.C., et al., HortScience 30:25–34 (1995).

Lakaul, r., MS Thesis, Modified–atmosphere packaging of apple slices: Modeling respiration and package oxygen partial pressure as function of temperature and film characteristics. School of Packaging, Michigan State University (1994).

Debeaufort, F. and A. Voilley, J. Agr. Food Chem. 42:2871–2875 (1994).

DePooter, H.L., et al., J. Agr. Food Chem. 31:813–818 (1983).

Song, J., and F. Bangerth, Acta Hort. 368:150–159 (1994).

Gardner, H.W., et al., J. Agr. Food Chem. 38:1316–1320 (1990).

Galliard, T., Lipolytik and lipoxygenase enzymes in plants and their action in wounded tissues. In: G. Kahl (ed.). Biochemistry of wounded plant tissues. Walter de Gruyter, Berlin 155–201 (1978).

(List continued on next page.)

*Primary Examiner*—David Lacey
*Assistant Examiner*—Drew Becker
*Attorney, Agent, or Firm*—Ian C. McLeod

[57] ABSTRACT

A method for increasing aroma and reducing fungal growth in vegetables and fruits is described. The method uses hexanal in a controlled atmosphere to treat the harvested fruit. The method has been found to be particularly effective for Penicillium sp. and Botrytis sp.

10 Claims, 8 Drawing Sheets

OTHER PUBLICATIONS

Drawert, F., et al., Chem. Mikrobiol. Technol. Lebenn 2:10–22 (1973).

Aharoni, Y., and G.J. Stadelbacher, Phytopathology 63:544–545 (1973).

Avissar, I., et al., Acta Hort 258:655–660 (1989).

Caccioni et al., J. Plant Diseases and Protection 102(5):518–525 (1995).

Kelman, A. Phytopathology 1374 (1989).

Wisniewski, M.E. and C.L. Wilson, HortScience 27:94–98 (1992).

Hamilton–Kemp, T.R., et al., J. Chem. Ecol. 18:1083–1091 (1992).

Vick, B.A., and D.C. Zimmerman, Oxidative Systems for Modification of fatty acids: The lipoxygenase pathway, 53–90. In: P.K. Stumpf (ed.). The biochemistry of plants vol. 9. Academic Press (1987).

Paillard, N.M.M., Evolution of the Capacity of Aldehyde Production by crushed apple tissues, during an extended storage of fruits, 368–378. in: G. Charalambous (eds.).

The shelf life of foods and beverages. Proc. 4th Intl. Flavor Conf. Elsevier Science publishers B.V., Amsterdam (1986).

Paillard, N.M.M., The Flavor of apples, pears and quinces. In: I.D. Morton and A.J. MaCleod (eds.). Food Flavors. Part C: the flavor of fruits. Elsevier Science publishers B.V., Amsterdam 1–42 (1990).

FIG. 8

METHOD FOR THE INHIBITION OF FUNGAL GROWTH IN FRUITS AND VEGETABLES

CROSS-REFERENCE TO RELATED APPLICATION

This application claims priority to Provisional application Ser. No. 60/057,113, filed Aug. 28, 1997.

BACKGROUND OF THE INVENTION (1) Field of the Invention

The present invention relates to the use of hexanal in vapor form as an antifungal agent for fruits and vegetables. The present invention also provides odor (aroma) enhancement in the fruits and vegetables. This is accomplished by treating the fruit or vegetable for at least 36 hours with the hexanal.

(2) Description of Related Art

Prior art of interest is described in U.S. Pat. No. 4,336,273 to Lee; U.S. Pat. No. 4,387,248 to Pickenhagen; and Caccioni et al., J. Plant Diseases and Protection 102 (5):518–525 (1995)).

Many kinds of synthetic fungicides have been used to prevent decay of perishable plant products, although, some may pose oncogenic risks, which has lead to public concern. As a result, fungicides will face greater restrictions and limitations in the future. Using natural products with fungistatic properties may be an attractive alternative to prevent decay. There is also an ever-increasing demand by the consumer for consistently safe healthy food with good flavor quality. Solving of these major problems is an important step forward, not only for plant production, but also for food science and technology.

Postharvest fungicides and fungistats are used only in a select few commodities. The reason for the lack of chemical use is that residue levels on treated products tend to be quite high relative to fungicides applied pre-harvest. This is primarily due to the short time between application and consumption. In those few instances where postharvest fungicides are applied, they are usually applied as a drench treatment in which the fruit or vegetables are either submerged or a stream of material is applied from above. In some cases, postharvest fungicides are applied in a wax.

Thus, treated products are subjected to a wetting treatment in the prior art. The mix is recirculated numerous times, such that a significant load of dirt, fungal spores and other material are deposited on all of the produce. The application procedure is time-demanding and expensive and interrupts the flow of product into storage.

Loss of perishable fruit and vegetables during the postharvest period is estimated to range from 20% to 25% despite the use of sophisticated postharvest storage facilities and techniques (Jeffries, P., and M. J. Jeger, Postharvest News Info. 5:365–368 (1990); Kelman, A., Phytopathology 1374 (1989)). Of these losses, decay accounts for a significant proportion. Many kinds of synthetic fungicides have been used to prevent the decay of perishable plant products, although some may pose carcinogenic risks, which has led to public concern (Wisniewski, M. E. and C. L. Wilson, HortScience 27:94–98 (1992)). As a result, fungicides will face greater restrictions and limitations in the future. Using natural products with fungistatic properties may be an attractive alternative to prevent decay. Wilson et al (Wilson, C. L., et al., Crop Protection 10:172–177 (1991)) noted that a number of natural volatile compounds have fumigative effects.

Six-carbon ($C_6$) aldehydes have been found to inhibit the hyphae growth of *Alternaria alternata* and *Botrytis cinerea* (Hamilton-Kemp, T. R., et al., J. Chem. Ecol. 18:1083–1091 (1992)). Six-carbon aldehydes, with or without double bonds are dominant compounds released by plant material through the lipoxygenase pathway after tissue damage (Vick, B. A. and D. C. Zimmerman, Oxidative systems for modification of fatty acids: The lipoxygenase pathway, 53–90. In: P. K. Stumpf (ed.). The biochemistry of plants. vol. 9. Academic Press (1987)). It has not been determined if these wound volatiles are involved in the active or passive defense systems in the plant.

Six-carbon aldehydes are also important precursors for the formation of $C_6$ alcohols and $C_6$-containing esters, which are among the most abundant volatile compounds in apple, pears, and bananas and contribute to typical fruity odors (Paillard, N.M.M., Evolution of the capacity of aldehyde production by crushed apple tissues, during an extended storage of fruits, 368–378. In: G. Charalambous (eds.). The shelf life of foods and beverages. Proc. 4th Intl. Flavor Conf. Elsevier Science publishers B. V., Amsterdam (1986); Paillard, N.M.M., The flavor of apples, pears and quinces. In: I. D. Morton and A. J. MaCleod (eds.). Food Flavors. Part C: The flavor of fruits. Elsevier Science publishers B. V., Amsterdam 1–42 (1990)). Headspace treatment with $C_6$ aldehydes can enhance total aroma production in "Golden Delicious" apple fruit in low $O_2$ storage (DePooter, H. L., et al., J. Agr. Food Chem. 31:813–818 (1983)). Even immature fruit, for which volatile biosynthesis is extremely low, respond to $C_6$ aldehyde application with enhanced aroma volatile biosynthesis (Song, J., and F. Bangerth, Acta Hort. 368:150–159 (1994)).

SUMMARY OF THE INVENTION

The present invention relates to a method for inhibiting fungal growth on and aroma of a fruit or vegetable which comprises exposing the fruit or vegetable to an effective amount of an aldehyde which is a natural precursor to normally produced aroma compounds in the fruit or vegetable to inhibit fungal growth on and enhance aroma of the fruit or vegetable.

The present invention relates to a method for inhibiting fungal growth on a fruit or vegetable which comprises exposing the fruit or vegetable to an effective amount of hexanal in a controlled atmosphere around the fruit or vegetable, so as to inhibit the fungal growth on the fruit or vegetable without changing the edibility of the fruit or vegetable.

Hexanal as a natural volatile acts as residueless antifungal agent that enhances aroma biosynthesis in fruits and vegetables. This invention permits control of fungal growth on harvested horticultural products such as fresh fruit and vegetables with no detectable residue of the antifungal agent. In response to the applied hexanal, plant organs respond by the production of copious amounts of aroma. The method of application is via a vapor.

OBJECTS

The objective of this invention is to develop a new strategy for application of fungicistic natural volatiles to fruits and vegetables and lightly processed fruit and vegetable products having little to no residue, but enhanced flavor.

DESCRIPTION OF PREFERRED EMBODIMENTS

The system can be used in atmosphere controlled storage with relatively non-reactive gases or with carbon dioxide to prevent fungal growth. All of this is well known to those skilled in the art.

EXAMPLE 1

In this Example, the object was to explore the potential of using hexanal vapor as a natural, metabolizable fungicide for minimally processed (sliced) apple. The object was to determine the effect of hexanal vapor on hyphae growth of *Penicillium expansum* and *B. cinerea* on artificial medium and on apple fruit slices. In addition, the extent to which aroma volatile production of apple slices was enhanced by the interconversion of hexanal vapor to aroma volatiles and whether hexanal itself emanated from treated fruit at detectable levels was determined. Finally, the permeability of low-density polyethylene (LDPE) film to hexanal and hexylacetate was measured over a temperature range of 0 to 30° C. to determine the feasibility of using hexanal in packaged apple slices.

MATERIALS AND METHODS
Biological Technique

Pure strains of the fruit pathogens *P. expansum* and *B. cinerea* were obtained, respectively, from the American Type Culture Collection (Rockville, Md.) and the laboratory of Rodney Roberts (USDA-ARS, Wenatchee Tree Fruit Research Station, Wenatchee, Wash.). In this research, the general medium potato dextrose agar (PDA) was used for culturing both fungi. Stock cultures of *P. expansum* and *B. cinerea* were stored in glycerol at −70° C. and the stock culture was thawed in an ice bath before use. Inoculum was obtained by diluting the stock culture with sterilized water to a spore or conidia concentration of about 3×10$^5$ cells/mL.
Bioassay System A flow-through vapor exposure system similar to that of Gardner et al (Gardner, H. W., et al., J. Agr. Food Chem. 38:1316–1320 (1990)), with some modification, was constructed. Under sterile conditions, 5 $\mu$L of inoculum was pipetted onto the surface of apple slices and PDA-filled petri plates. There were three inoculation sites per PDA petri dish and two inoculation sites per apple slice. Exposure chambers were 10-L glass desiccators, each containing four uncovered petri dishes and four apple slices. Desiccators and tubing were sterilized and contamination from nonsterilized tubing and inlet air was avoided using in-line microbial filters (0.45 $\mu$m pore size). Concentrated hexanal vapors were generated by passing sterilized air through or over liquid hexanal (99.9%, Sigma Chemical Co.) in a glass container. The hexanal vapor was mixed with hexanal-free air to obtain target hexanal concentrations by adjusting the air flow rates with glass microbore capillary tubes and a pressure regulator. Air containing hexanal was directed into the desiccator with 3-mm-i.d. flexible Teflon tubing impermeable to hexanal. The flow rate through the desiccator was 20 to 25 mL.min$^{-1}$. Treatment concentrations of hexanal were about 4.1, 10.3, 18.6, 26.9, and 55.8 $\mu$mol.L$^{-1}$ (100, 250, 450, 650, and 1350 ppm, respectively). Gas samples for hexanal and aroma volatile analysis were obtained at a sampling port fitted with a Teflon-lined septum at the outlet of the exposure chamber. Gas concentrations measured at this point were taken to represent desiccator concentrations. The atmosphere in the desiccator was humidified by passing the diluted hexanal vapor through sterilized water in a 500-mL beaker located in the desiccator. The relative humidity in the system was >90%, as determined by an electronic hydrometer (model 15-3001; Hydrodynamics).
Plant Material Apple fruit ("Jonagold" and "Golden Delicious") were harvested from the Michigan State University Clarksville Horticulture Experiment Station and stored at 0° C. until used (within 5 to 10 d after harvest). Fruit were warmed to ambient temperature 22±1° C., 12 h equilibration), sliced into wedges (20 to 25 g), inoculated and exposed to air with or without hexanal.
Antifungal Assessments Inoculated apple slices and petri plates were exposed to untreated air and hexanal vapor concentrations for 48 hours in five successive experiments. For the 10.3- and 18.6- $\mu$mol.L$^{-1}$ treatments, an additional study was performed to determine if previously growing colonies responded to hexanal similar to germinating spores. Three inoculated petri plates for each fungus were allowed to grow in hexanal-free air for 48 hours, then transferred to the treatment chamber for a 48 hour exposure period. After treatment, the petri plates were moved again to hexanal-free air.

Hyphae growth of fungi (diameter of the colonies) was monitored daily from outside the desiccator using a scale marked on the bottom of the inverted clear glass petri dishes. Because of the difficulty of measuring the change of the colony diameter on the surface of the apple slices, only the presence (positive) and absence (negative) of a decay lesion was noted.
Hexanal Analysis A hexanal standard concentration was generated by evaporating a small amount of liquid hexanal (0.5 to 10 $\mu$L) into a specially made 4.4-L glass jar fitted with a Mininert gas-tight sampling valve (Alltech Assoc., Deerfield, Ill.). After the liquid had volatilized, a 20-μL gas sample was removed using a gas-tight syringe (Hamilton no. 1810) with a removable stainless-steel needle. Pumping the syringe plunger 30 times (which apparently saturated the adsorption sites inside the needle) gave a consistent gas chromatography (GC) analysis with a cv of 2% to 5%. The hexanal concentration in the treatment chambers was determined at the outlet of the desiccator. A GC (Carle GC series 400) equipped with a flame ionization detector (FID) was used to measure hexanal vapor concentrations. The column (3.3 m long, 3 mm i.d., 10% DEGS-PS, 80/100 mesh; Supelcoport) was maintained at 140° C. Helium was used as carrier gas at flow rate of 20 mL.min$^{-1}$.

Volatile Analysis

The sampling of aroma volatiles was via a solid-phase micro-extraction (SPME) device (Supelco, Bellefonte, Pa.) fitted with a fiber coated to a thickness of 100 μm with polydimethylsiloxane. The fiber was inserted through the Teflon-lined septum in the outlet of the desiccator for 20 s. Absorbed volatiles were desorbed from the fiber into the injection port of a GC (model 3400; Varian). The injector was a SPI on-column injector maintained at 200° C. The desorption time was 40 s. Volatiles were separated using a HP-5 capillary column (10 m, 0.1 mm i.d., 0.34 μm film thickness; Hewlett Packard). Volatile detection was by a time-of-flight mass spectrometer (MS) with an electronic ionization source (FCD-540, LECO Corp., St. Joseph, Mich.). The carrier gas used was ultra purified helium (99.999%) at flow rate 1.2 mL.min$^{-1}$. The temperature was isothermal for 4 min at 40° C. and then raised at the rate of 10° C./min to 230° C. and held at 230° C. for 15 min. The transfer line temperature was 220° C. Mass spectra were collected at a rate of 50 spectra/s over a mass range m/z 40 to 250. The electron ionization energy was 70 eV.

Identification of volatile components was confirmed by comparing collected mass spectra with those of authentic compounds and by comparison to spectra in the National Institute for Standard Technology (NIST) mass spectra library (Search version 1.0).

RESULTS

Effect of Hexanal on Germination and Growth of Fungi

The 4.1-μmol.L$^{-1}$ treatment inhibited growth of *P. expansum* and *B. cinerea* completely during the 48-hour exposure period (Tables 1 and 2). After an additional 48 hours in hexanal-free air (hour 96), the treated colonies had grown to 50% of the control colony diameter. A concentration of 10.3 μmol.L$^{-1}$ prevented fungal growth during the exposure period, but also had an additional carryover effect. No growth of *B. cinerea* occurred for the next 24 hours, and *P. expansum* had no growth for 48 hours after treatment (Tables 1 and 2). Both organisms subsequently recovered and reached about 50% of control growth by 168 hours. At concentrations of hexanal above 18.6 μmol.L$^{-1}$, growth of both fungi was completely arrested during the exposure period and for the subsequent 120 hours of the experiment.

TABLE 1

Effect of 48 h exposure to hexanal vapor on the hyphae growth of *Penicillium expansum* on potato dextrose agar in a humidified, aerobic environment at 22° C.

| | Hexanal | Hyphae growth of fungi (mm)$^z$ Time (h) | | | | | | |
|---|---|---|---|---|---|---|---|---|
| Expt. | (μmol · L$^{-1}$) | 24 | 48$^y$ | 72 | 96 | 120 | 144 | 168 |
| 1 | 0 | 8.0 ± 0.05 | 13.7 ± 0.9 | 19.7 ± 1.2 | 28.7 ± 0.5 | 38.6 ± 2.53 | 41.3 ± 0.9 | 50.0 ± 1.69 |
|   | 4.1 | 0 | 0 | 6.7 ± 0.9 | 14.6 ± 0.5 | 22.3 ± 2.1 | 29.6 ± 0.9 | 35.5 ± 0.5 |
| 2 | 0 | 6.3 ± 0.94 | 9.3 ± 0.47 | 17.2 ± 0.7 | 27.7 ± 0.9 | 34.3 ± 0.91 | 45.3 ± 1.4 | 54.6 ± 2.1 |
|   | 10.3 | 0 | 0 | 0 | 5.3 ± 0.5 | 10.3 ± 0.5 | 22.3 ± 2.1 | 25 ± 2.1 |
| 3 | 0 | 8.67 ± 0.470 | 16.0 ± 4.22 | 22.7 ± 0.94 | 29.3 ± 0.9 | 41.3 ± 2.5 | 44.0 ± 2.820 | 50.7 ± 0.9 |
|   | 18.6 | 0 | 0 | 0 | 0 | 0 | 0 | 0 |
| 4 | 0 | 5.3 ± 0.47 | 7.7 ± 0.5 | 18.6 ± 0.9 | 28.7 ± 0.9 | 31.0 ± 1.4 | 38.3 ± 1.2 | 41.0 ± 0.8 |
|   | 26.9 | 0 | 0 | 0 | 0 | 0 | 0 | 0 |
| 5 | 0 | 5.7 ± 0.47 | 9.4 ± 0.94 | 22.7 ± 0.47 | 33.7 ± 0.9 | 40.7 ± 1.6 | 42.7 ± 1.6 | 48.0 ± 1.6 |
|   | 55.8 | 0 | 0 | 0 | 0 | 0 | 0 | 0 |

$^z$Mean ± SD (n = 3).
$^y$End of treatment period.

TABLE 2

Effect of 48 h exposure to hexanal vapor on the hyphae growth of *Botrytis cinerea* on potato dextrose agar in a humidified, aerobic environment at 22° C.

| | Hexanal | Hyphae growth of fungi (mm)$^z$ Time (h) | | | | | | |
|---|---|---|---|---|---|---|---|---|
| Expt. | (μmol · L$^{-1}$) | 24 | 48$^y$ | 72 | 96 | 120 | 144 | 168 |
| 1 | 0 | 4.7 ± 0.05 | 21.7 ± 2.3 | 31.3 ± 0.9 | 44.3 ± 0.5 | 50.7 ± 1.25 | 54.6 ± 1.3 | 59.4 ± 0.9 |
|   | 4.1 | 0 | 0 | 0 | 11.0 ± 0.8 | 23.3 ± 2.35 | 37.6 ± 0.5 | 42.0 ± 1.6 |
| 2 | 0 | 6.3 ± 0.94 | 9.3 ± 0.47 | 17.6 ± 0.7 | 27.7 ± 0.9 | 34.3 ± 0.9 | 45.3 ± 1.4 | 54.6 ± 0.9 |
|   | 10.3 | 0 | 0 | 0 | 0 | 4.3 ± 1.2 | 12.7 ± 0.9 | 22.7 ± 0.9 |

TABLE 2-continued

Effect of 48 h exposure to hexanal vapor on the hyphae growth of
Botrytis cinerea on potato dextrose agar in a humidified, aerobic environment at 22° C.

| Expt. | Hexanal ($\mu$mol · L$^{-1}$) | Hyphae growth of fungi (mm)$^z$ Time (h) | | | | | | |
|---|---|---|---|---|---|---|---|---|
| | | 24 | 48$^y$ | 72 | 96 | 120 | 144 | 168 |
| 3 | 0 | 7.33 ± 0.5 | 19.3 ± 2.35 | 30.7 ± 0.94 | 40.3 | 46.7 ± 1.24 | 50.3 ± 1.24 | 56.7 ± 0.5 |
| | 18.6 | 0 | 0 | 0 | 0 | 0 | 0 | 0 |
| 4 | 0 | 5.3 ± 0.4730 | 10.3 ± 0.5 | 14.0 ± 0.9 | 23.3 ± 1.3 | 38.7 ± 0.9 | 46.7 ± 2.4 | 58.0 ± 0.5 |
| | 26.9 | 0 | 0 | 0 | 0 | 0 | 0 | 0 |
| 5 | 0 | 5.3 ± 0.47 | 19.4 ± 0.94 | 24.2 ± 0.47 | 34.3 ± 0.9 | 40.7 ± 0.9 | 47.4 ± 2.05 | 56.7 ± 2.05 |
| | 55.8 | 0 | 0 | 0 | 0 | 0 | 0 | 0 |

$^z$Mean ± SD (n = 3).
$^y$End of treatment period.

Effect of Hexanal on Growth of Established Colonies

Figure 1A:
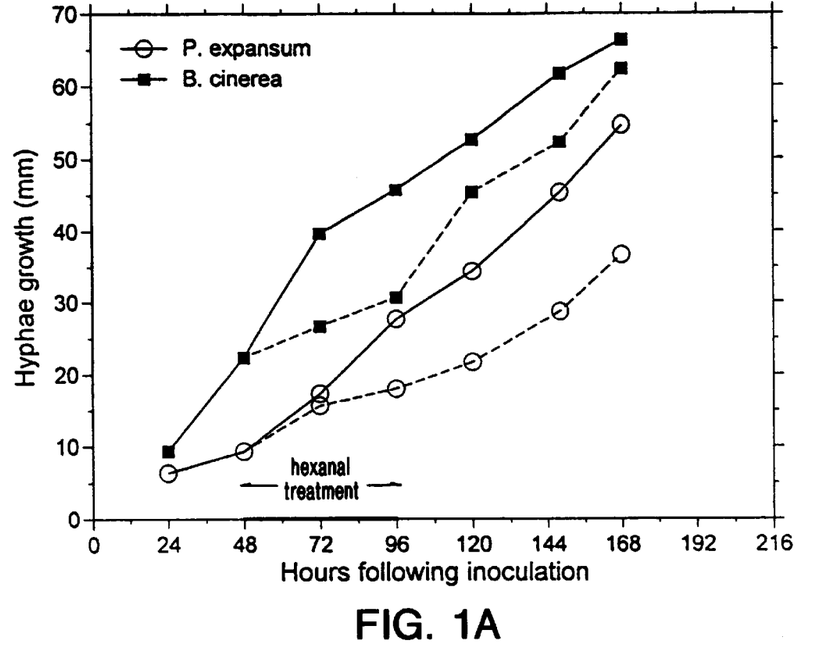
FIG. 1A Hyphae growth of *Penicillium expansum* and *Botrytis cinerea* after exposure to hexanal vapor at concentration of 10.3 $\mu$mol.L$^{-1}$ (100 ppm) for 48 h. Dashed line indicates treated cultures.
Figure 1B:
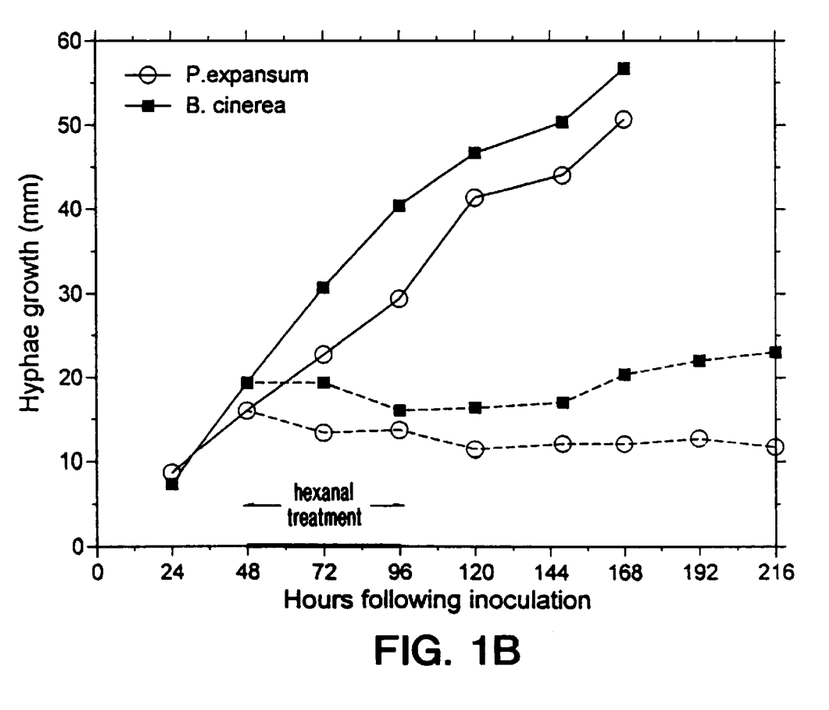
FIG. 1B Hyphae growth of *P. expansum* and *B. cinerea* after exposure to hexanal vapor at concentration of 18.6 ($\mu$mol.K$^{-1}$) for 48 h. Dashed line indicates treated cultures.

During exposure, hexanal concentrations of 10.3 and 18.6 $\mu$mol.L$^{-1}$ stopped hyphae growth of established fungal colonies that had previously grown for 48 hours in hexanal-free air (FIGS. 1A and 1B). Following cessation of exposure to hexanal, hyphae growth resumed for the 10.3-$\mu$mol.L$^{-1}$ treatment, but not following the 18.6-$\mu$mol.L$^{-1}$ treatment. After the 10.3-$\mu$mol.L$^{-1}$ treatment, regrowth of $P.$ $expansum$ was about 50% less than the control, but regrowth of $B.$ $cinerea$ was similar to that of controls. No regrowth of $P.$ $expansum$ occurred following treatment with a hexanal concentration of 18.6 $\mu$mol.L$^{-1}$ (FIG. 1B). Five days after exposure to 18.6 $\mu$mol L$^{-1}$ hexanal, only a slight regrowth of $B.$ $cinerea$ (10%) was measured (FIG. 1B).

Effect of Hexanal on Decay of Inoculated Apple Slices

The growth of fungi in apple slices of "Golden Delicious" and "Jonagold" were entirely inhibited during exposure to 10.3 and 18.6 $\mu$mol.L$^{-1}$ hexanal vapor (Table 3).

TABLE 3

Effect of hexanal vapor exposure for 48 h on lesion
growth of Penicillium expansum and Botrytis cinerea on
slices of "Jonagold" apple fruit. Symbols indicate
presence (+) or absence (-) of decay lesions.

| | | Penicillium expansum | | | Botrytis cinerea | | |
|---|---|---|---|---|---|---|---|
| | Hexanal | Time (h) | | | | | |
| Expt. | ($\mu$mol · L$^{-1}$) | 24 | 48 | 72 | 24 | 48 | 72 |
| 1 | 0 | − | + | + | − | − | + |
| | 10.3 | − | − | − | − | − | − |
| 2 | 0 | − | + | + | − | − | + |
| | 18.6 | − | − | − | − | − | − |

Following exposure, no lesion expansion was observed. No effect of hexanal vapor on the color of either the cortex or the skin was observed for any of the treatments.

Effect of Hexanal on Aroma

Figure 2A:
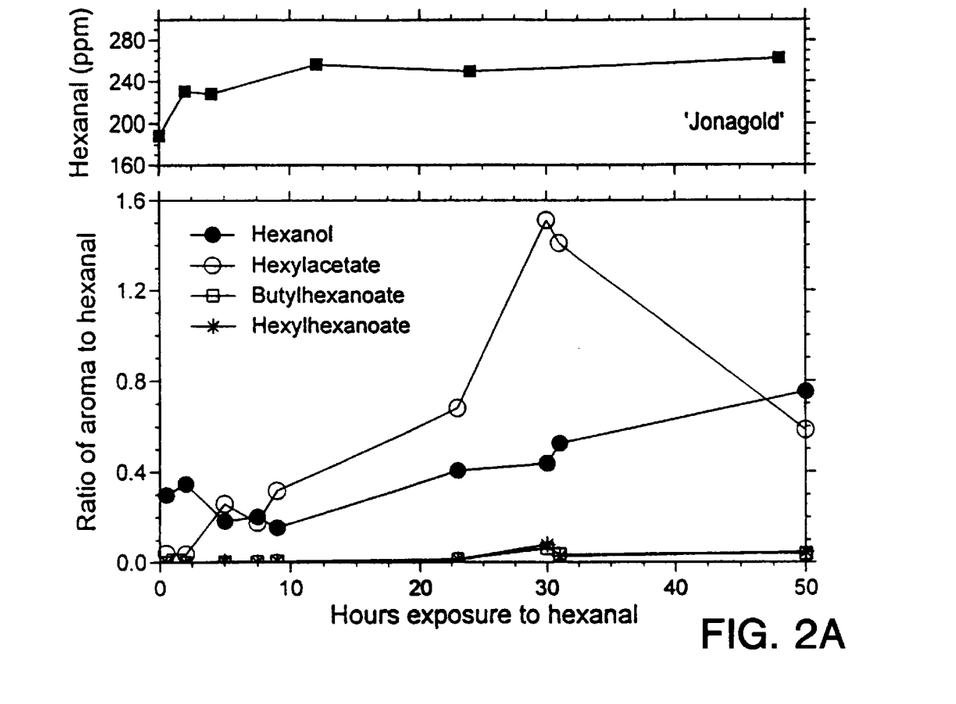
FIG. 2A Volatile compounds emanating from "Jonagold" apple slices during hexanal vapor exposure at concentration of 10.3 $\mu$mol.L$^{-1}$.
Figure 2B:
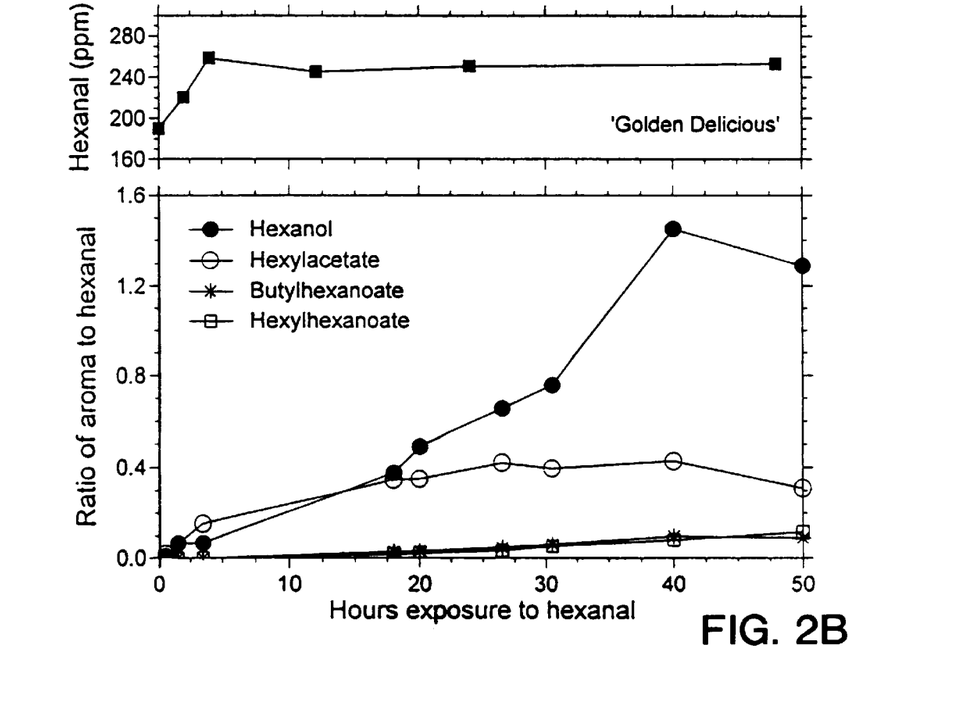
FIG. 2B Volatile compounds emanating from "Golden Delicious" apple slices during hexanal vapor exposure at concentration of 10.3 $\mu$mol.L$^{-1}$.

Aroma volatiles exiting the control (hexanal-free) chamber were not detectable for either "Jonagold" or "Golden Delicious" slices (data not shown). However, there was significant aroma production by apple slices after only 0.5 h exposure to 10.3 $\mu$mol.L$^{-1}$ hexanal for both cultivars (FIG. 2A and 2B). Aroma data are presented as the ratio of aroma to hexanal concentration in the exit line as an estimate the relative rate of metabolic conversion of hexanal to aroma volatiles by the apple slices. For "Jonagold", hexanal interconversion to hexanol was immediately detected; however, hexylacetate production began to increase only after 5 h (FIG. 2A). After 7.5 h, the production of butylhexanoate and hexylhexanoate was detectable; by the end of the exposure period (50 h), their ratio relative to hexanal in the chamber exit line increased to 0.06 and 0.08, respectively. Additionally, after 24 h, traces of hexylbutanoate, 2-methylpropylhexanoate, propylhexanoate, and butylbutanoate were also identified by GC-MS (data not shown) and had the same temporal trends as hexylacetate. At 30 h, the chamber hexylacetate concentration reached the highest level, about 1.5 times that of hexanal. This maximum was followed by a decline in the hexylacetate/hexanal ratio to about 0.5 by hour 50. "Golden Delicious" slices, like those of "Jonagold", continuously converted hexanal to hexanol, hexylacetate and hexylhexanoate, but at somewhat different rates (FIG. 2B). The ratio of hexanol to hexanal was 1.5 after 18 h; however, the highest ratio for hexylacetate was just 0.4 and occurred after 26 h. The ratio of butylhexanoate and hexylhexanoate to hexanal only reached 0.1 at the end of the exposure period, which was slightly higher than for "Jonagold".

Hexanal and Aroma Emanations after Treatment Cessation

Figure 3:
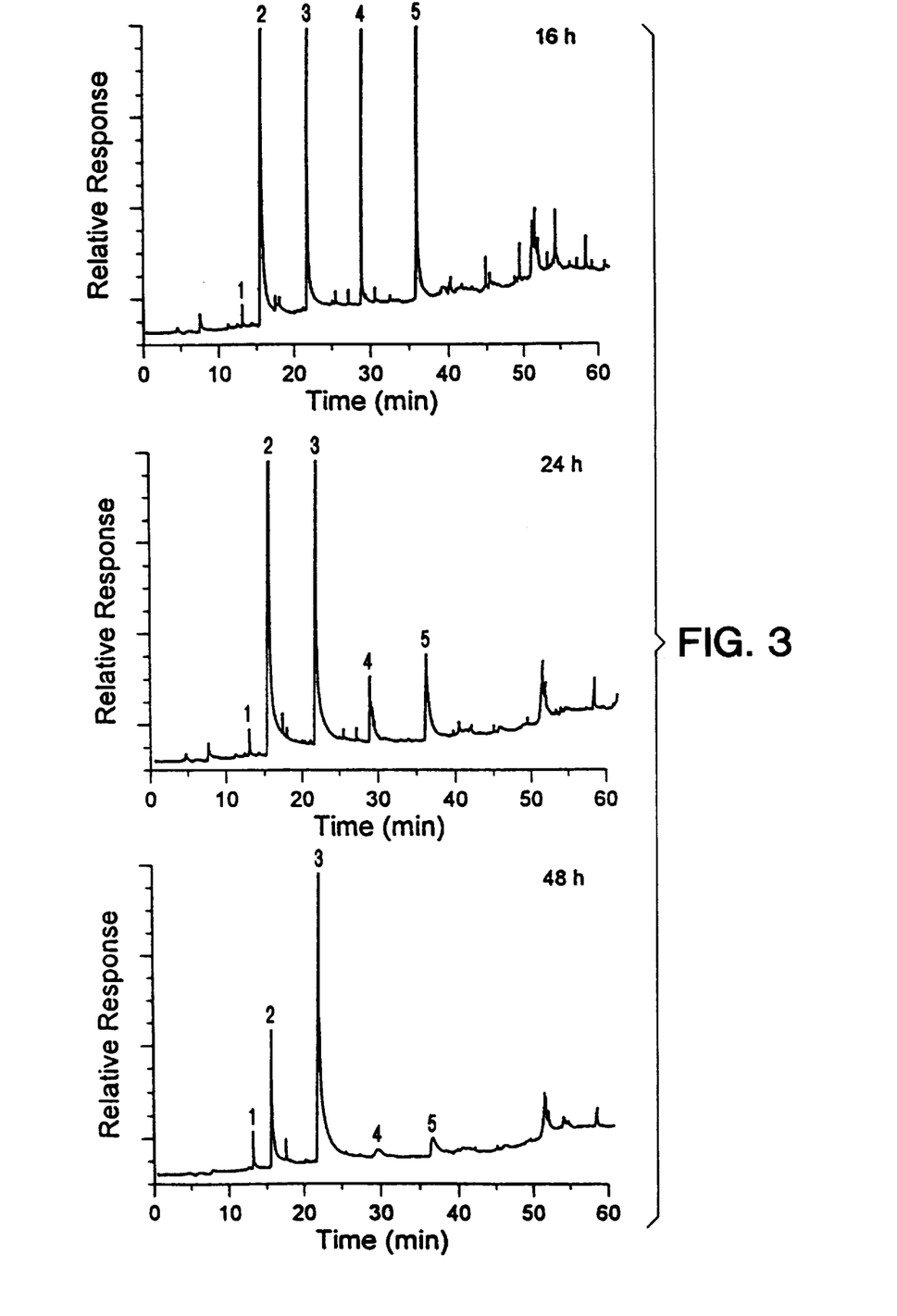
FIG. 3 shows decline in volatile compounds emanating from "Golden Delicious" apple slices with time after exposure to a hexanal vapor concentration of 10.3 $\mu$mol.L$^{-1}$. (1, butylacetate; 2, hexanal; 3, hexylacetate; 4, butylhexanoate; 5, hexylhexanoate).

Hexanal could not be detected emanating from treated slices 16 h after treatment with hexanal at a concentration of 10.3 $\mu$mol.L$^{-1}$ (FIG. 3). The lower limit of detection of our system was about $4.13 \times 10^{-5}$ $\mu$mol.L$^{-1}$ (1 ppb), which is below the odor threshold for humans (Devos, M., et al., Standardized human olfactory thresholds. Oxford Univ. Press, New York (1990)). A rapid decrease in hexanol, hexylacetate, and hexylhexanoate occurred following treatment, with hexanol declining more rapidly than the other four primary metabolic products of hexanal and hexylacetate declining least rapidly.

EXAMPLE 2

LDPE Permeability to Hexanal and Hexylacetate

LDPE permeability to hexanal and hexylacetate was determined via a specially built permeation cell. The permeation cell was constructed of two hemispheric glass chambers, each fitted with inlet and outlet ports. The donor and receiver hemispheres were separated by the test film with an area of 7.55 cm$^2$. Purified and humidified air with (donor side) and without (receiver side) hexanal was metered through the two chambers. On the donor side, the volatile concentration was generated in the same manner as for the vapor exposure chambers and was maintained between 2.2 and 3.5 $\mu$mol.L$^{-1}$. A 50-$\mu$L gas sample was withdrawn using a gas-tight syringe fitted with stainless steel jacketed capillary tube as a needle. Gas analysis was the same as described previously for hexanal; however, the coating of the capillary needle accentuated the sorption of vapors, resulting in a greater amount of material being retained in the needle, thereby increasing sensitivity.

Permeability was measured at 0, 5, 10, 15, 20, 25 and 30° C. by placing the entire apparatus in a controlled-temperature chamber. Donor- and receiver-side concentrations were determined 10 or more times at each temperature for each of two pieces of 0.00254-cm (1-mil)-thick LDPE film. Permeability is expressed as $mol.m^{-2}.s^{-1}.Pa^{-1}$.

LDPE Permeability to Hexanal and Hexylacetate

Figure 4:
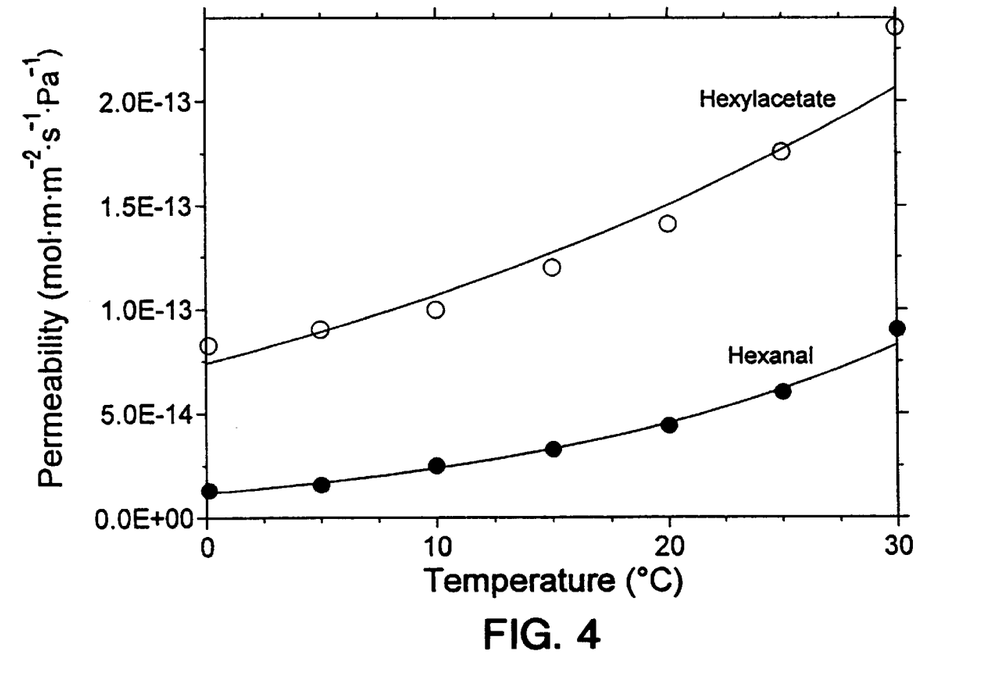
FIGS. 4 and 4A show the effect of temperature on LDPE permeability to hexanal and hexylacetate ($P_{hexanal}$ and $P_{hexylacetate}$). Arrhenius plot of hexanal and hexylacetate permeability for typical film sample.
Figure 4A:
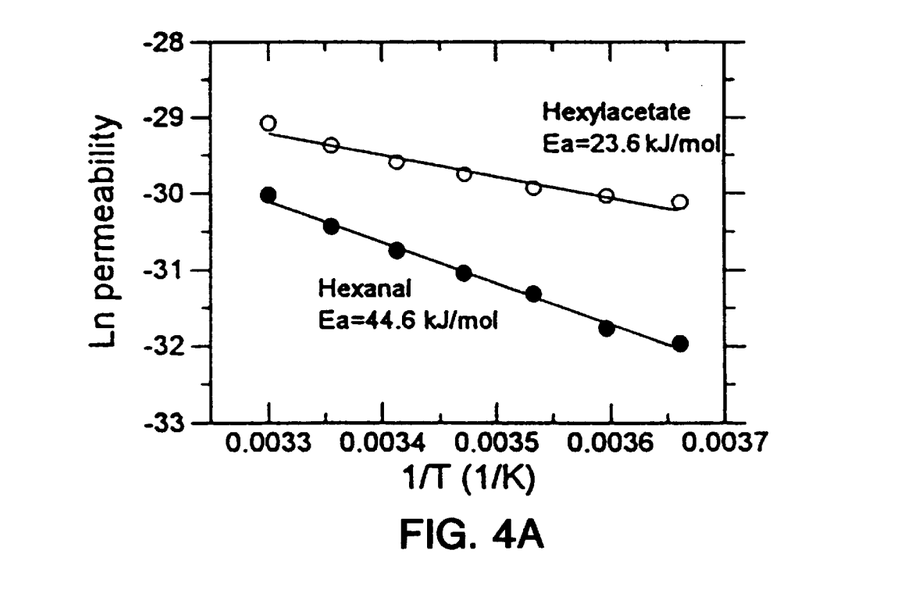

The permeability of hexanal and hexylacetate increased exponentially with temperature increase (FIG. 4). The natural log of the permeability changed linearly with reciprocal of temperature (K) according to the Arrhenius equation:

$$ln(Pi)=Ea/RT+ln(A)$$

where Pi is hexanal or hexylacetate permeability ($mol.m.m^{-2}.s^{-1}.Pa^{-1}$); Ea is the energy of activation ($kJ.mol^{-1}$); and R is the gas constant ($0.0083144 kJ.mol^{-1}.K^{-1}$). The slope of the fitted line is $-Ea/R$ (FIG. 4A). The Ea for permeation of the gases was calculated from the fitted line and was 44.6 $kJ.mol^{-1}$ for hexanal and 23.6 $kJ.mol^{-1}$ for hexylacetate with respective coefficient of determination ($r^2$) values of 0.99 and 0.94. The equations of the fitted lines were rearranged to facilitate expression of $P_{hexanal}$ and $P_{hexylacetate}$ for the LDPE film at any T (K) as follows:

$$P_{hexanal}=0.53495 \times exp(-5364.1/T)$$

$$P_{hexylacetate}=0.00032 \times exp(-2832.6/T)$$

Hexanal permeability was lower than that of hexylacetate. The permeability of both compounds increased exponentially with temperature, with hexanal permeability increased 6-fold while hexylacetate increased only 2.5-fold between 0 and 30° C.

Lipoxygenase-related volatiles may play a role in plant response to wounding and other related stresses (Hildebrand, D. F., et al., Curr. Top. Plant. Biochem. Physiol. 7:210–209 (1988)). A burst of lipoxygenase activity accompanying wounding of the cell leads to the production of fatty acid hydroperoxides, or their decomposition to compounds like $C_6$ and $C_9$-aldehydes (Galliard, T., Lipolytik and lipoxygenase enzymes in plants and their action in wounded tissues. In: G. Kahl (ed.). Biochemistry of wounded plant tissues. Walter de Gruyter, Berlin 155–201 (1978)). Drawert et al (Drawert, F., et al., Chem. Mikrobiol. Techno. Lebenn 2:10–22 (1973)) reported that the identified $C_6$-aldehydes, hexanal, (Z)-3-hexenal, and (E)-2-hexenal produced enzymatically when cellular structures are disrupted in green vegetables. These lipoxygenase reaction products can act as toxic agents to invading pathogens (Hildebrand, D. F., et al, Curr. Top. Plant. Biochem. Physiol. 7:210–209 (1988)). The findings of significant antifungal effects of hexanal using the quantitative vapor system demonstrated that hexanal was effective in reducing fungal activity during the exposure period and, at higher concentrations, had a residual effect, preventing fungal regrowth probably due to a fungicidal action.

The inhibitory effect of hexanal vapors on the growth of P. expansum and B. cinerea is well supported by the literature (Wilson, C. L., et al., Crop Protection 10:172–177 (1991)). A number of natural volatile compounds have been found to have antipathogenic effects. These compounds fall in various chemical categories but are primarily aldehydes and ketones. Natural antifungal volatiles examined for commercial applicability include acetaldehyde (Aharoni, Y., and G. J. Stadelbacher, Phytopathology 63:544–545 (1973); Avissar, I., et al, Acta Hort 258:655–660 (1989)), 2-nonanone (Vaughn, S. F., et al., J. Food Sci. 58:793–796 (1993)), ethyl benzoate (Wilson, C. L., et al, Plant Dis. 71:316–319 (1987)), acetic acid (Sholberg, P. L., et al., HortScience 30:1271–1275 (1995)), and $C_6$-aldehydes such as hexanal and trans-2-hexenal (Hamilton-Kemp, T. R., et al, J. Chem. Ecol. 18:1083–1091 (1992)).

A primary concern in the application of antifungal volatile compounds having aromas is the alteration of fruit flavor. Acetaldehyde, for instance, has been reported to cause off-flavor (Paillard, N.M.M., The flavor of apples, pears and quinces. In: I. D. Morton and A. J. MaCleod (eds.) Food flavors. Part C: The flavor of fruits Elsevier Science Publishers B. V., Amsterdam 1–42 (1990)) as well as improved flavor (Paz, O., et al., J. Food Sci. 47:270–273 (1982)). The strong fruity-floral aroma of 2-nonanone may be incompatible with some fruit types, such as apple. Additionally, for apple, concentrations of 2-nonanone below that needed to inhibit decay organisms induced browning of the apple skin. Hexanal treatment, however, does not pose similar problems. Aldehydes such as hexanal and their oxidation products such as hexanol and hexanoic acid act as precursors for a wide range of "fruity" aroma volatiles important to fruit flavor (Bartley, I. M., et al., J. Sci. Food Agr. 36:567–574 (1985); Drawert, F., et al, Chem. Mikrobiol. Technol. Lebenm 2:10–22 (1973)). Thus, hexanal vapor is consumed as it is converted to compounds that enhance aroma in apple (DePooter, H. L., et al., J. Agr. Food Chem. 31:813–818 (1983); Song, J., et al., Acta hort. 368:150–159 (1994)). The metabolism of hexanal would explain the inability to detect hexanal emanations from treated fruit by either instrument or smell 16 h after cessation of hexanal treatment. The ability of apple tissues to metabolize hexanal is also consistent with the rapid decline in hexanol and the other aroma volatiles detected following cessation of hexanal treatment. Similarly, Song (Song, J., et al. Acta Hort. 368:150–159 (1994)) found hexanal enhancement of aromas to last only a few days following exposure.

The enzyme system responsible for this interconversion of aldehydes to alcohols to esters is the sequential reactions of alcohol dehydrogenase (ADH, E.C 1.1.1.1) and alcohol acetyltransferase (AAT, E.C 2.3.1.84). These enzymes were apparently highly active in apple slices. It is interesting to note that the small mass of apple tissue (about 80 g) being used in the experiment converted most of the supplied hexanal to hexanol and, subsequently, hexylacetate and related compounds. The dynamics of the conversion of hexanal to hexanol and hexanol to hexylacetate in "Jonagold" and "Golden Delicious" slices is consistent with earlier findings that the precursor availability, rather than enzyme activities, is perhaps the most important factor for regulating volatile production in apple fruit (Bartley, I. M., et al, J. Sci. Food Agr. 36:567–574 (1985); Song, J. and F. Gangerth, Acta hort. 368:150–159 (1994)). The two cultivars in this study differed somewhat in their response to hexanal application. While "Jonagold" fruit exhibited a significant capacity to synthesize hexanol at the initiation of the experiment, "Golden Delicious" did not. In fact, the "Golden Delicious" fruit exhibited a continued increase in their capacity to convert hexanal to hexanol, which may be indicative of an increase in the capacity of ADH over time. "Jonagold" fruit, on the other hand, appeared to undergo an increase in the competence of AAT activity with time.

Modified-atmosphere packaging storage has some potential as an atmospheric control system to prolong the storage life of perishable products (Beaudry, R. M., et al., J. Amer. Soc. Hort. Sci. 117:436–441 (1992); Cameron, A. C., et al., HortScience 30:25–34 (1995)). If the concept of atmospheric control is expanded to include introduced volatiles, the application of volatiles in a packaging system to prevent decay is appropriate for apple slices (Lakaul, R., MS Thesis, Modified-atmosphere packaging of apple slices: Modeling respiration and package oxygen partial pressure as function of temperature and film characteristics. School of Packaging, Michigan State University (1994)). The permeability data here show that LDPE is a relatively poor barrier to hexanal and hexylacetate, and the data are consistent with reported values (Delassus, P. T., et al., ACS Symp Ser. 365 (1988)). This suggests hexanal introduced into the package headspace would escape rapidly. The higher Ea for hexanal compared to hexylacetate indicates hexanal retention would be relatively better at lower temperatures. The permeability of hexanal and each of its metabolic products can be used to develop models to describe their flux similar to models developed for $O_2$ and $CO_2$ (Cameron, A. C., et al, HortScience 30:25–34 (1994)). If need be, a gaseous release mechanism such as that described by Vaughn et al (Vaughn, S. F., et al., J. Food Sci. 58:793–796 (1993)) can be used to release a predictable level of vapor into the package headspace to compensate for that lost from the package. More polar films cam be used (Debeaufort, F. and A. Voilley, J. Agr. Food. Chem. 42:2871–2875 (1994)).

The data suggest hexanal vapor has a number of attributes that may be important to consumers demanding more natural control measures for fruit diseases and fewer toxic residues. In addition, hexanal-derived aroma enhancement is also desirable. Significantly, fruit of a number of horticulturally important plant species utilize $C_6$-aldehydes as precursors to aromas. This suggests hexanal and similar aldehydes can be used rather widely as antifungal agents. Fruit having potential for aldehyde application include pears, strawberries, bananas, pineapple, and melons. Hexanal used in packaging of lightly processed products of these commodities is also possible.

EXAMPLE 3

Table 4 shows a sensory test (panel test) on processed "Mutsu" apple fruit after hexanal treatment. Quality attributes were judged on a 1–9 scale where 1=high and 9=low for each attribute.

TABLE 4

| Term | Control Avg | Control Std | Treated Avg | Treated Std |
| --- | --- | --- | --- | --- |
| Aroma | 1.66 | 0.94 | 1.74 | 0.92 |
| Sweet | 2.6 | 1.13 | 2.4 | 0.95 |
| Sour | 1.86 | 0.92 | 2.2 | 1.2 |
| Off-flavor | 1.05 | 1.18 | 0.84 | 1.02 |
| Overall | 1.79 | 0.97 | 2.2 | 0.96 |

EXAMPLE 4

Table 5 shows percent of whole "Golden Delicious" apple fruit with decay after being inoculated with P. expansum, treated with 250 ppm hexanal vapor for 48 hours and held for 3 days at 23° C.

TABLE 5

| Lesion Diameter (cm) | +Hexanal Decay (%) | −Hexanal Decay (%) |
| --- | --- | --- |
| 0.5–1.0 | 21.4 | 0 |
| 1.0–1.5 | 61.9 | 0 |
| 1.5–2.0 | 16.7 | 61.9 |
| 2.0–2.5 | 0 | 33.3 |
| 2.5–3.0 | 0 | 4.7 |
| Total number of fruit in test | 42 | 42 |

EXAMPLE 5

Table 6 shows percent of whole "Mutsu" apple fruit with decay (any one or both of the inoculation points) after being inoculated with P. expansum, treated with 350 ppm hexanal vapor for 48 hours and held for 3 days at 23° C.

TABLE 6

| Lesion diameter (cm) | +Hexanal decay (%) | +Hexanal one (%) | +Hexanal two (%) | −Hexanal decay (%) | −Hexanal one (%) | −Hexanal two (%) |
| --- | --- | --- | --- | --- | --- | --- |
| | 45.7 | | | 0 | | |
| 0.1–1.0 | | 10.5 | 18.4 | | 0 | 2.6 |
| 1.0–1.5 | | 10.5 | 2.6 | | 5.3 | 23.7 |
| 1.5–2.0 | | 2.6 | 0 | | 0 | 68.4 |
| Total number of fruit | | 38 | | | 38 | |

EXAMPLE 6

Table 7 shows percent of whole "Golden Delicious" apple fruit with decay (any one or both inoculation points) after being inoculated with P. expansum, treated with 200–300 ppm hexanal vapor for 48 hours and held for 3 days at 23° C.

TABLE 7

| Lesion diameter (cm) | +Hexanal no (%) | +Hexanal one (%) | +Hexanal two (%) | −Hexanal no (%) | −Hexanal one (%) | −Hexanal two (%) |
| --- | --- | --- | --- | --- | --- | --- |
| | 1.7 | | | | | |
| 0.6–1.0 | | 1.7 | | | | |
| 1.1–1.5 | | | 50 | | | 11.7 |
| 1.6–2.0 | | | 46.7 | | | 50 |
| 2.1–2.5 | | | | | | 38.3 |
| Total number of fruit | | 60 | | | 60 | |

EXAMPLE 7

Table 8 shows percent of whole "Mutsu" apple fruit with decay (any one or both inoculation points) after being inoculated with P. expansum treated with 350–450 ppm hexanal vapor for 48 hours and held for 3 days at 23° C.

TABLE 8

| Lesion diameter (cm) | +Hexanal | | | −Hexanal | | |
|---|---|---|---|---|---|---|
| | no (%) | one (%) | two (%) | no (%) | one (%) | two (%) |
| | 55.3 | | | 0 | | |
| 0.6–1.0 | | 10.5 | 18.4 | | 0 | 2.6 |
| 1.1–1.5 | | 10.5 | 2.6 | | 5.3 | 23.7 |
| 1.6-2.0 | | 2.6 | | | | 68.4 |
| 2.1–2.5 | | | | | | |
| Total number of fruit | 38 | | | 38 | | |

EXAMPLE 8

Table 9 shows percent of whole "Golden Delicious" apple fruit with decay (any one or both inoculation points) after being inoculated with P. expansum, treated with 600–700 ppm hexanal vapor for 48 hours and held for 3 days at 23° C.

TABLE 9

| Lesion diameter (cm) | +Hexanal | | | −Hexanal | | |
|---|---|---|---|---|---|---|
| | no (%) | one (%) | two (%) | no (%) | one (%) | two (%) |
| | 76.1 | | | 2.2 | | |
| 0.6–1.0 | | 10.9 | 13.0 | | 6.5 | 39.1 |
| 1.1–1.5 | | | | | | 15.2 |
| 1.6–2.0 | | | | | | 37.0 |
| 2.1–2.5 | | | | | | |
| Total number of fruit | 46 | | | 46 | | |

EXAMPLE 9

Table 10 shows percent of whole "Mutsu" apple fruit with decay (any one or both inoculation points) after being inoculated with P. expansum, treated with 600 ppm hexanal vapor for 48 hours and held for 3 days at 23° C.

TABLE 10

| Lesion diameter (cm) | +Hexanal | | | −Hexanal | | |
|---|---|---|---|---|---|---|
| | no (%) | one (%) | two (%) | no (%) | one (%) | two (%) |
| | 76.1 | | | 2.1 | | |
| 0.1–1.0 | | 10.9 | 13 | | 6.5 | 39.1 |
| 1.0–1.5 | | | | | | 15.2 |
| 1.5–2.0 | | | | | | 37 |
| Total number of fruit | 46 | | | 46 | | |

EXAMPLE 10

Table 11 shows percent of whole "Golden Delicious" apple fruit with decay (any one or both inoculation points) after being inoculated with P. expansum, treated with 120–160 ppm hexanal vapor for 48 hours and held for 4 weeks at 4° C.

TABLE 11

| Lesion diameter (cm) | +Hexanal | | | −Hexanal | | |
|---|---|---|---|---|---|---|
| | no (%) | one (%) | two (%) | no (%) | one (%) | two (%) |
| | 86.7 | | | 61.4 | | |
| 0.6–1.0 | | 11.1 | | | 18.2 | 4.5 |
| 1.1–1.5 | | | 2.2 | | 6.8 | 2.3 |
| 1.6–2.0 | | | | | 6.8 | |
| 2.1–2.5 | | | | | | |
| Total number of fruit | 45 | | | 44 | | |

EXAMPLE 11

Table 12 shows percent of whole "Golden Delicious" apple fruit with decay (any one or both inoculation points) after being inoculated with P. expansum, treated with hexanal vapor for 48 hours and held for 6 weeks at 4° C.

TABLE 12

| Lesion diameter (cm) | +Hexanal (%) | −Hexanal (%) |
|---|---|---|
| no decay | 47.7 | 22.7 |
| 0.6–1.0 | 22.7 | 23.9 |
| 1.1–1.5 | 10.2 | 13.6 |
| 1.6–2.0 | 4.6 | 9.1 |
| 2.1–2.5 | 3.4 | 11.4 |
| >2.5 | 11.4 | 19.3 |
| Total number of fruit | 88 | 88 |

EXAMPLE 12

Figure 5A:
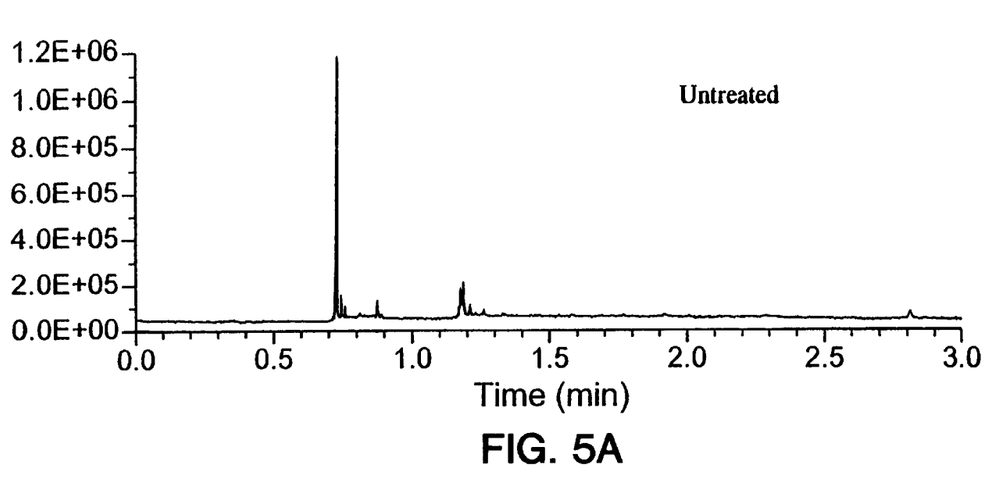
FIGS. 5A and 5B are graphs showing headspace volatile aroma compounds in apple sauce after treatment with hexanal vapor at 250 ppm for 48 hours.
Figure 5B:
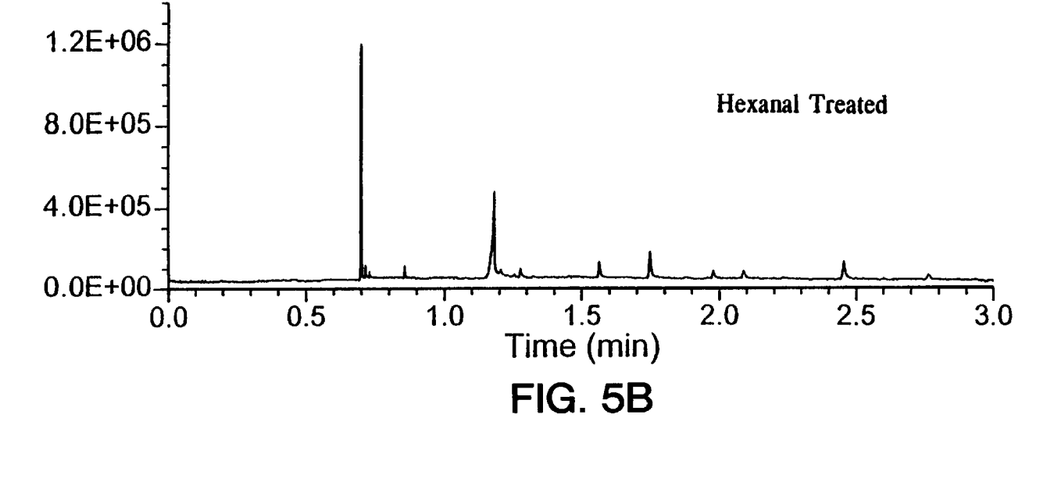

Fruit processed into apple sauce immediately after treatment with hexanal (FIG. 5B) have a similar, low compliment of aroma volatiles to those not treated (FIG. 5A). Thus the hexanal treatment does not markedly alter the aroma profile of treated fruit and those volatiles that are present are similar to those in the untreated sauce.

EXAMPLE 13

Figure 6A:
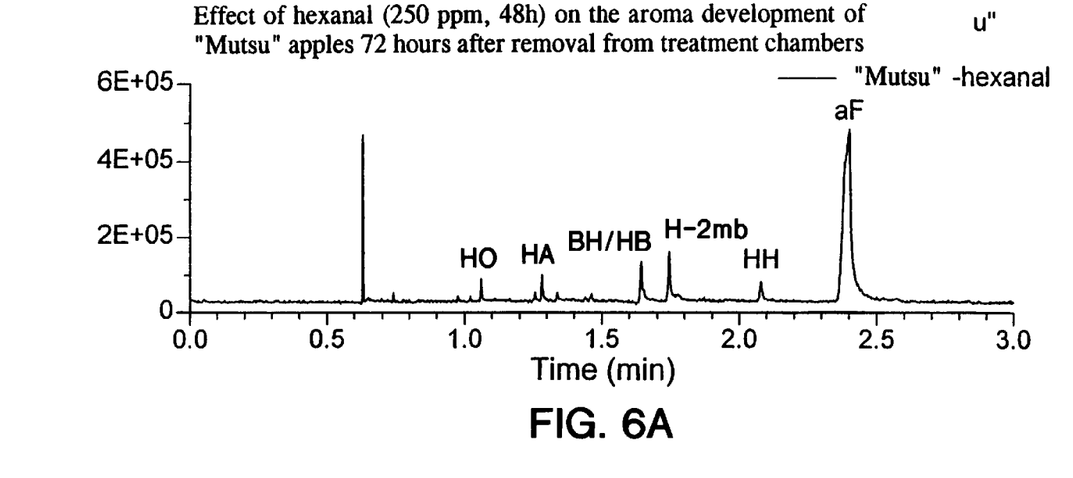
FIGS. 6A and 6B are graphs showing development of volatile aroma in "Mutsu" apples 72 hours after treatment with hexanal vapor at 250 ppm for 48 hours.
Figure 6B:
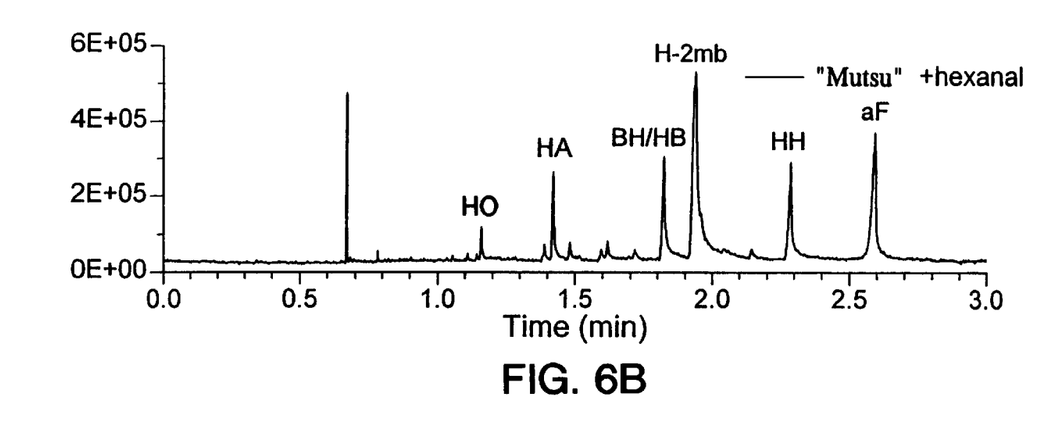
Figure 7A:
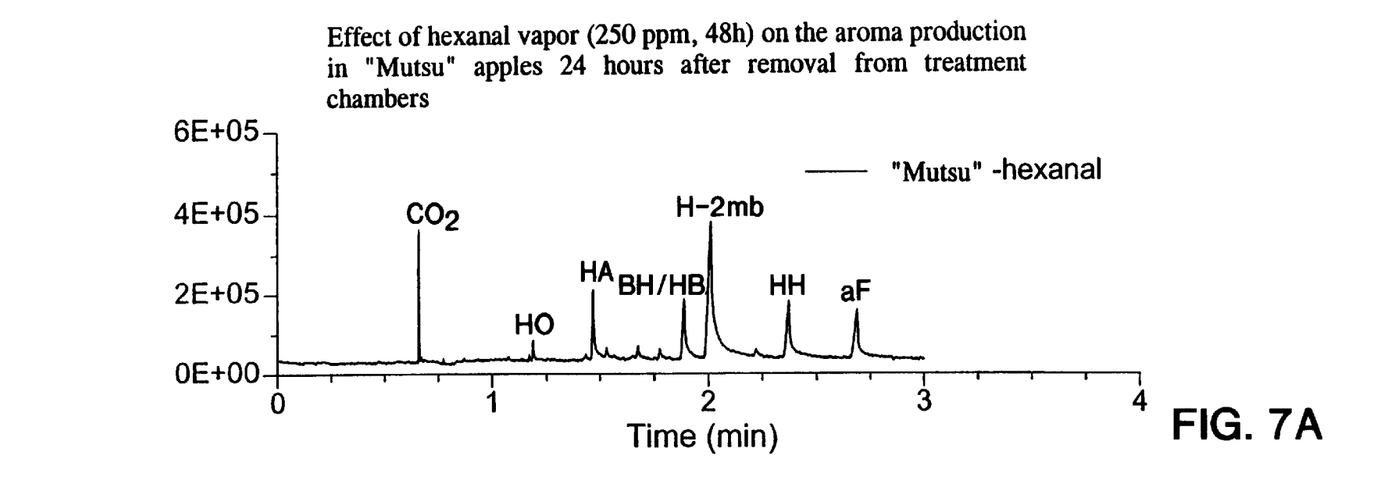
FIGS. 7A and 7B are graphs showing development of volatile aroma in "Mutsu" apples 24 hours after treatment with hexanal vapor at 250 ppm for 48 hours.
Figure 7B:
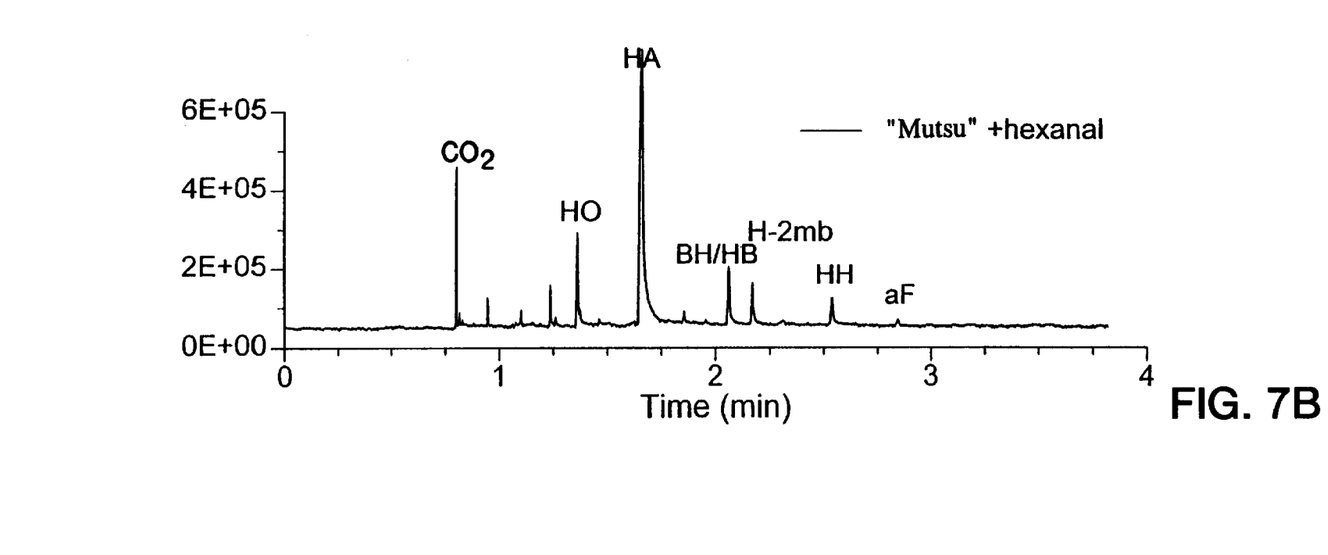

Treatment of apple fruit with hexanal, leaves no detectable residue 24 hours (FIGS. 7A and 7B) or 72 hours (FIGS. 6A and 6B) after removal of apple fruit from treatment chambers. In this case, fruit were untreated or treated with 250 ppm hexanal for 48 hours, removed from the treatment chambers and held in air at 22° C. for 24 and 72 hours. While some volatile compounds were still found in excess (e.g., HA and H-2mb) as the metabolized hexanal was converted to aroma comounds, no hexanal was detected emanating from the apple fruit.

EXAMPLE 14

Figure 8:
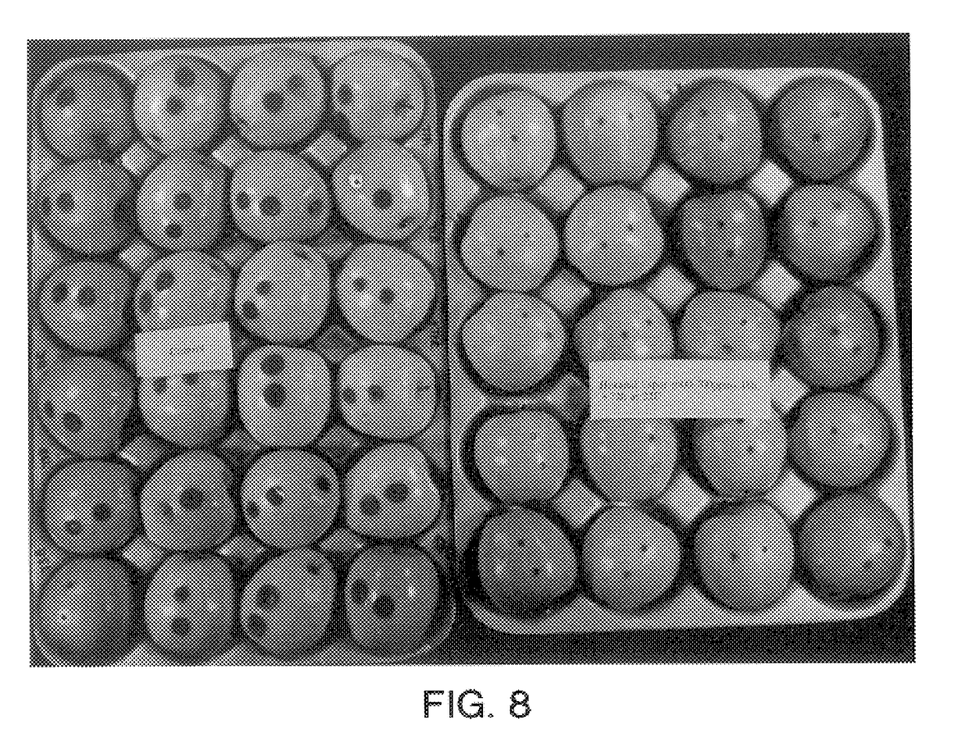
FIG. 8 is a photograph showing the effect of hexanal vapor treatment (right side) on decay of "Golden Delicious" apple fruit inoculated with *P. expansum* by using the point of screw 3–4 mm deep and held for 72 hours at 22° C.

Treatment of whole fruit with hexanal can protect the fruit from decay even after the fruit have been inoculated with disease pathogens such as Penicillium expansum (FIG. 8). In this example, "Golden Delicious" apple fruit were inoculated with Penicillium expansum in wounds caused by the point of a screw 3-4 mm deep and subsequently received no treatment or were treated with 600 to 700 ppm hexanal vapor for 48 hours and further held for 72 hours at 22° C. after vapor treatment. Those fruit not receiving the hexanal treatment experienced rapid and serious decay, whereas those fruit receiving the hexanal treatment experienced little to no decay.

Other naturally occurring antifungal aldehydes are: propanal; 2-methyl propanal; butanal; 3-methyl butanal; 2-methyl butanal; pentanal; hexanal; 3-hexenal; 2-hexenal; and heptanal.

It is intended that the foregoing description be only illustrative and that the present invention be limited only by the hereinafter appended claims.

We claim:

1. A method for inhibiting fungal growth on and to enhance aroma of a fruit or vegetable which comprises exposing the fruit or vegetable to an effective amount of hexanal in a controlled atmosphere around the fruit or vegetable, so as to inhibit the fungal growth on the fruit or vegetable without changing the edibility of the fruit or vegetable and to enhance aroma.

2. The method of claim 1 wherein the fruit or vegetable is exposed to between 1 and 1500 $\mu$mol/liter of hexanal in the controlled atmosphere.

3. The method of claim 1 wherein the controlled atmosphere is air.

4. The method of claim 1 wherein the controlled atmosphere is carbon dioxide.

5. The method of any one of claims 1, 2, 3 or 4 wherein the controlled atmosphere is in a closed storage facility for the fruit or vegetable.

6. The method of any one of claims 1, 2, 3 or 4 wherein the controlled atmosphere is in a sealed package for the fruit or vegetable.

7. The method of claims 1, 2, 3 or 4 wherein the fruit is an apple.

8. The method of claims 1, 2, 3 or 4 wherein the fungus is Penicillium sp.

9. The method of claims 1, 2, 3 or 4 wherein the fungus is a Botrytis sp.

10. The method of any one of claims 1, 2, 3 or 4 wherein the aroma of the fruit or vegetable is enhanced by the exposure.

* * * * *